US006679289B2

United States Patent
Sisk

(10) Patent No.: US 6,679,289 B2
(45) Date of Patent: Jan. 20, 2004

(54) SWING CHECK VALVE

(75) Inventor: David E. Sisk, Bonne Terre, MO (US)

(73) Assignee: Sure Seal, Inc., Mineral Point, MO (US)

( * ) Notice: Subject to any disclaimer, the term of this patent is extended or adjusted under 35 U.S.C. 154(b) by 62 days.

(21) Appl. No.: 09/968,257

(22) Filed: Oct. 1, 2001

(65) Prior Publication Data

US 2002/0078999 A1 Jun. 27, 2002

Related U.S. Application Data

(60) Provisional application No. 60/237,045, filed on Oct. 2, 2000.

(51) Int. Cl.[7] .............................................. F16K 15/03
(52) U.S. Cl. ................. 137/527.2; 137/527; 137/454.2; 137/315.16
(58) Field of Search ....................... 137/315.16, 315.33, 137/527, 527.2, 454.2, 454.5, 454.6

(56) References Cited

U.S. PATENT DOCUMENTS

| 79,527 A | * | 6/1868 | Wilson ..................... 137/527.2 |
| 613,516 A | * | 11/1898 | James ..................... 137/527.2 |
| 1,635,842 A | * | 7/1927 | Hirshstein ................. 137/527.2 |
| 4,842,014 A | * | 6/1989 | Strelow et al. .......... 137/527.2 |
| 4,967,790 A | * | 11/1990 | Ganske ..................... 137/527.8 |
| 5,785,077 A | * | 7/1998 | Rice ....................... 137/315.16 |
| 5,794,655 A | * | 8/1998 | Funderburk et al. ........ 137/527 |
| 6,152,173 A | * | 11/2000 | Makowan .................... 137/527 |
| 6,314,993 B1 | | 11/2001 | Matthews et al. |

OTHER PUBLICATIONS

"Bayco" product sheets for 2" Pneumatic Swing Check Valves.
"KNAPPCO" product sheets for "Swing Check Valves".

* cited by examiner

Primary Examiner—John Rivell
Assistant Examiner—Ramesh Krishnamurthy
(74) Attorney, Agent, or Firm—Paul M. Denk

(57) ABSTRACT

The present invention relates to a light weight check valve for use in bulk material transfers that incorporates a smooth, generally spherical interior cavity to minimize flow inefficiencies. The check valve is made from two portions: a body portion and a lid assembly which is removably mounted to the body portion. The gate valve, or poppet, is hingedly mounted to the lid assembly. Hence, when the check valve assembly is opened for inspection, by removing the lid assembly, the poppet is removed along with the lid assembly, to allow for easy inspection of the poppet.

6 Claims, 8 Drawing Sheets

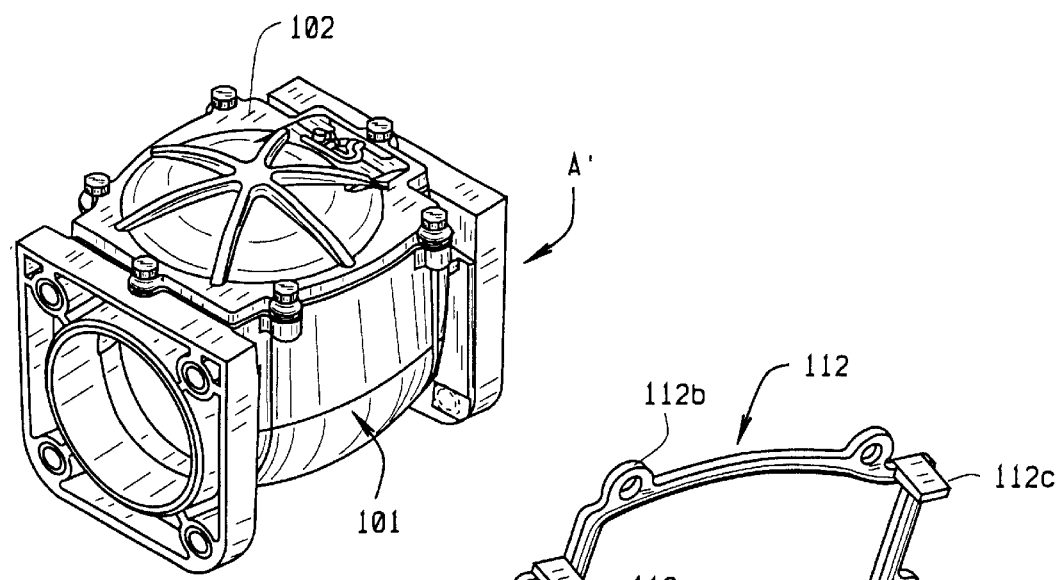
FIG. 15
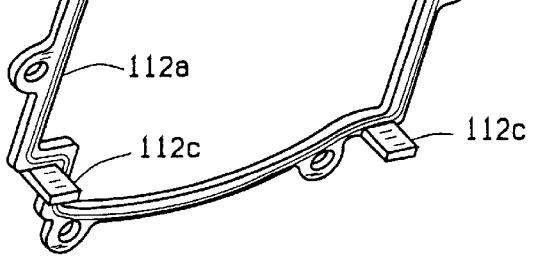
FIG. 16
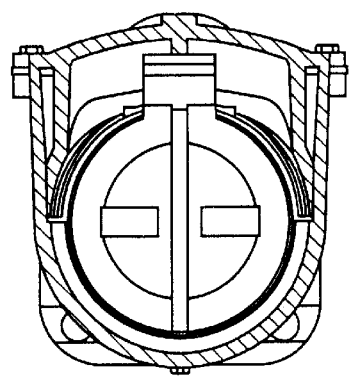
FIG. 17
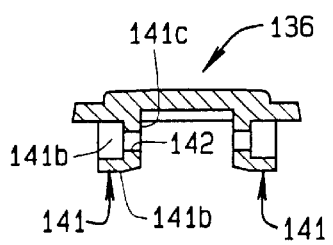
FIG. 19
FIG. 18

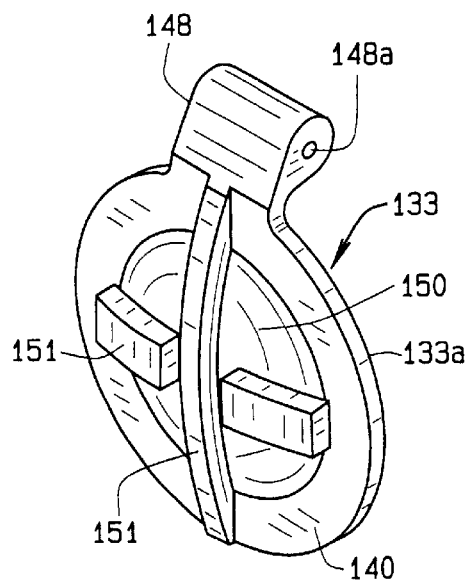
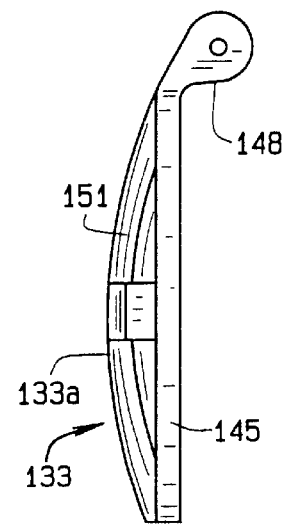
FIG. 24   FIG. 25
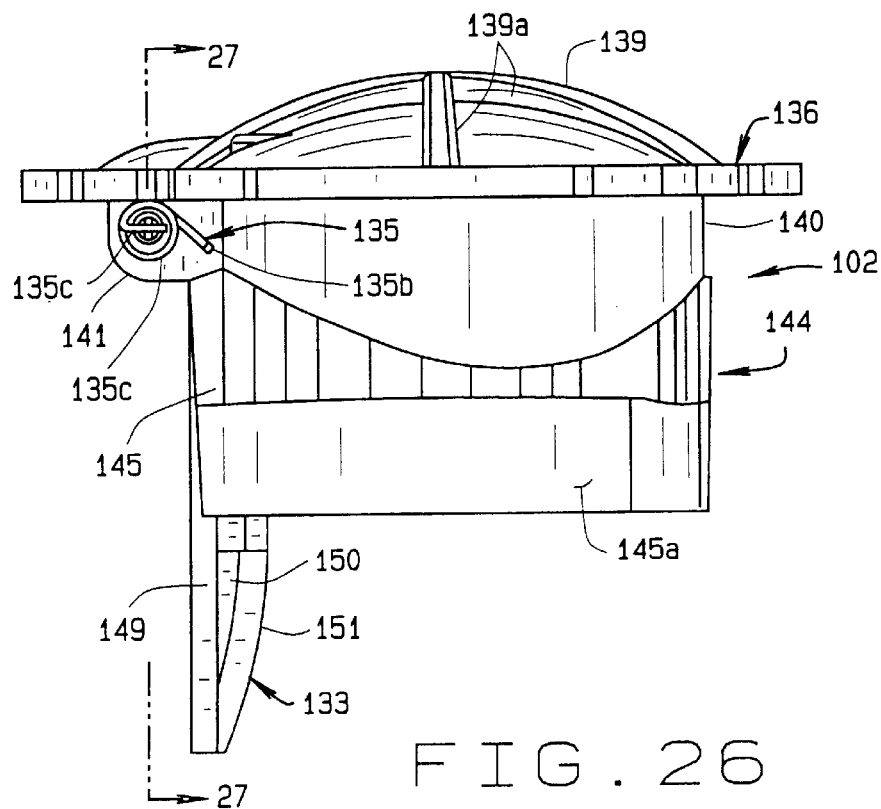
FIG. 26

SWING CHECK VALVE

CROSS-REFERENCE TO RELATED APPLICATIONS

This application claims priority to provisional application Ser. No. 60/237,045 filed Oct. 2, 2000, entitled Plastic Swing Check Valve, and which is incorporated herein by reference.

STATEMENT REGARDING FEDERALLY SPONSORED RESEARCH OR DEVELOPMENT

Not Applicable.

BACKGROUND OF THE INVENTION

The present invention relates to an apparatus for allowing the transfer of bulk materials or fluids in containers, pipes or hoses, in one direction, but not in the opposite direction, and more particularly, to a lighter weight and more efficient swing check valve for use in the transfer of such materials or fluids.

In the trucking industry, dry bulk materials and fluids (i.e., liquids and gasses) must regularly be transferred between truck trailer containers and either fixed storage containers or mobile containers, such as on ships planes or other trucks. In order to facilitate rapid transfer of the bulk materials and fluids, and to limit leakage, swing check valves are typically placed at the inlet ports on the containers. These valves have an internal pivoting gate, referred to as a "poppet," that swings out of the way when the material flows in one direction, and drops in place to close the valve with a gasket seal when the material attempts to flow in the opposite direction. The valves are self-contained and require no external actuation other than the material flow itself.

Conventional valves for most dry bulk trailer use are typically constructed of aluminum. Although lighter in weight than most metals, aluminum is significantly heavier than many materials, including plastics. In an application such as trucking, where large valves are required and carrying capacities are limited by loaded vehicle weight, any amount of weight reduction in the check valve directly results in greater load capacity, and thereby improved efficiency and reduced costs.

In addition, when a bulk material or fluids (the transferred product) are transferred between storage containers, the transferred product must pass through the valve at a very rapid rate. Any irregularities (including irregularities due to pitting) in the shape of the check valve's inner surface will create turbulence in the material transfer that can slow the transfer. The greater the extent of the irregularities, the greater the turbulence and the greater the inefficiency in material transfer. Accordingly, it is desirable for the inner surface to be as spherical, smooth and free from pits and protrusions as possible. However, not only are the surfaces of the access port and poppet in a conventional check valve irregular in shape, conventional check valves exhibit burs and pits on the valve's inner surfaces from the casting process that finishing does not fully remove. These all result in undesirable excess turbulence during material flow.

Furthermore, check valves require regular inspection and maintenance. Each valve has an access port for this purpose, generally located at the top of the valve. Complete inspection can only be accomplished by removing the access port, an external pivot pin assembly for the poppet, and then the internal poppet assembly. The same procedure must be followed to remove the poppet gasket for replacement, the most common maintenance and repair need on check valves. Because the gasket is typically glued to the poppet, the entire poppet assembly often must be replaced when the gasket fails.

SUMMARY OF THE INVENTION

The present invention resides in a light weight check valve for use in bulk material transfers, and more particularly for use on truck trailer containers where the reduced weight over conventional metal valves provides efficiency benefits. The check valve is preferably made of an appropriate plastic which can withstand the bulk material or fluid passing through the check valve. Plastic is preferred due to the smooth surface that can be formed, and due to its ability to withstand pitting. Hence, the surface will remain smooth (i.e., will not become severely pitted, which can cause turbulent fluid flow through the valve). However, the check valve can also be made of other light weight materials. The poppet and access port in the present invention are configured such that when the check valve opens to allow air and material flow, the combined interior surfaces of the valve, excluding the inlet and outlet flow ports, mate smoothly against one another to form a nearly spherical shape. This, in combination with the smooth surface of the valve, reduces the amount of turbulence in the valve, increases flow efficiencies and enables increased flow rates.

Further, the poppet assembly and access port are coupled internally so that both can be removed as a single unit for easy and rapid inspection of the entire valve. A simple seal such as an O-ring, or preferably a Quad-Ring® (available from Minnesota Rubber of Minneapolis, Minn.), located on the rim inside the valve against which the poppet closes, forms the poppet seal. In contrast to conventional check valves, this Quad-ring seal can be easily and rapidly replaced when necessary.

The present invention is readily adaptable to virtually any size check valve, and can readily be combined with numerous interfaces for connection to a variety of containers, pipes and hoses.

Additional features of the present invention will be in part apparent and in part pointed out hereinafter.

BRIEF DESCRIPTION OF THE DRAWINGS

FIG. 15 is a perspective view of the a second embodiment of the check valve, when fully assembled;

FIG. 16 is a perspective view of the lid gasket for the second embodiment.

FIG. 17 is a cross-sectional view of the fully assembled check valve of FIG. 15 with the gate closed, as viewed from the center of the valve toward the input side of the valve;

FIG. 18 is a side elevational view of the lid assembly of the check valve of FIG. 15;

FIG. 19 is a cross-sectional view lid assembly taken along line B—B of FIG. 18 showing of the hinge area of the lid assembly;

FIG. 24 is a perspective view of the poppet for the check valve of FIG. 15;

FIG. 25 is a side elevational view of the poppet;

FIG. 26 is an additional side view of the lid in the second embodiment; and

Corresponding reference characters indicate corresponding parts throughout the several views of the drawings.

DETAILED DESCRIPTION OF THE PREFERRED EMBODIMENT

Figure 1:
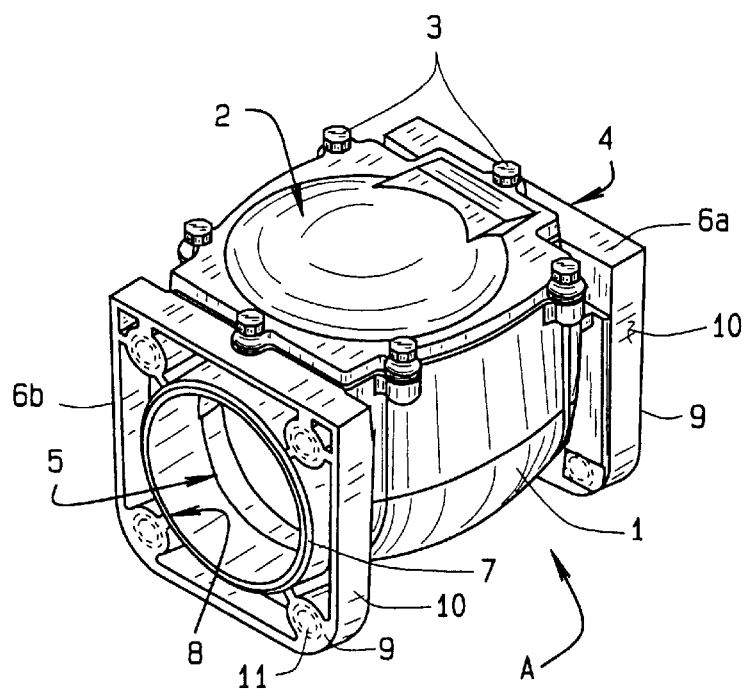
FIG. 1 is a perspective view a first embodiment of a fully assembled check valve of the present invention.

A first embodiment of a assembled check valve A is shown in FIG. 1. The check valve is preferably made of a plastic which can withstand the materials or fluids which flow through the check valve. In particular, preferably the plastic will withstand pitting due to corroding effects of the material which passes through the check valve so that the inner surfaces of the check valve will remain smooth. A preferred plastic is a polyamide (such as Grilon PVZ-5H available from EMS-Chemie (North America), Inc. of Sumter, N.C.) combined with Nylon and with impact modifiers. Other preferably light weight materials which will withstand the environment to which they are subjected and which will withstand pitting can be used as well.

The check valve A includes a hollow body 1 and a lid assembly 2 fixedly attached to the body 1 by six bolts 3. A thin, flat gasket 12 forms a seal between the body 1 and the lid assembly 2. The body 1 comprises a generally spherical shape that transforms into two parallel, generally square shaped, fitting plates 6a and 6b at opposite ends of the body 1. Each fitting plate 6a,b has an end face 9, generally flat perimeter faces 10, and a thickness equal to approximately one tenth the overall length of the body 1. Brass nut inserts 11 are imbedded in the end faces 9 at each of the eight corners of the fitting plates 6a and 6b to facilitate ready attachment between the valve A and containers, pipes, hoses or other external devices to which the valve A can be attached.

The fitting plates 6a and 6b have an input port 4 and an output port 5, respectively to allow dry bulk material or fluids to flow through the input port 4, through the body 1, and through the output port 5. The input port 4 and output port 5 are coaxial, each having equal diameters and a circular rim 8 located at the end faces 9, perpendicular to the central axis of the ports 4 and 5. A circular groove 7, concentric with the ports 4 and 5, is formed in each end face 9 of the fitting plate 6. The groove 7 has an inner diameter slightly greater than that of the rim 8, and a depth and outer diameter configured to accommodate standard compression Quad-ring seals (available from Minnesota Rubber of Minneapolis, Minn.) for sealing the valve to, for example, a container or a supply hose.

To minimize cost and weight, the bodies of the fitting plates 6a and 6b comprise webbed members between the outer edges of the groove 7, the supporting rings about the brass nut inserts 11, and each of the sidewalls supporting the perimeter faces 10.

Figure 2:
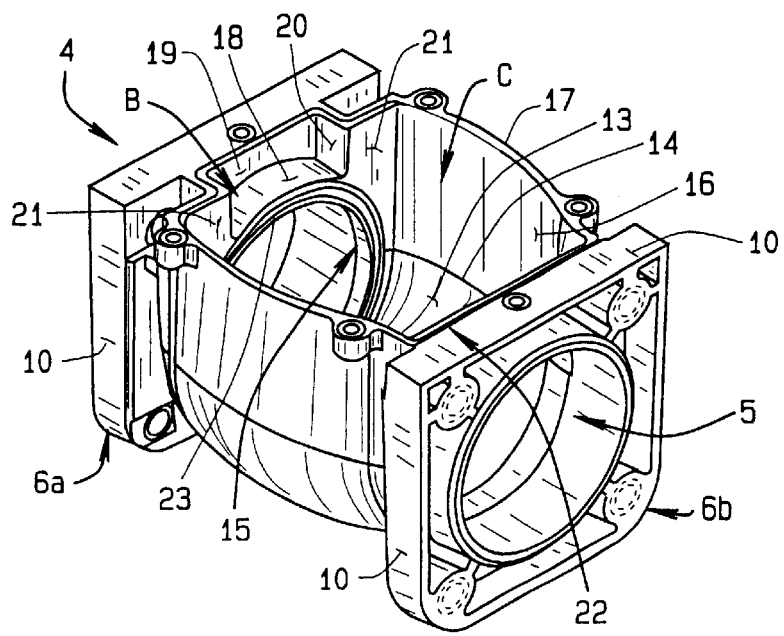
FIG. 2 is a perspective view of the check valve with the lid assembly removed.

The body 1 defines a cavity C (FIG. 2), wherein the bottom half of the cavity C comprises a smooth, elongated hemispherical surface 13 truncated at the ports 4 and 5. The surface 13 ends with ledges 14 at the approximate midheight of each side of the body 1 between the ports 4 and 5. The ledges 14, thereupon extend radially a short distance beyond the surface 13, and run laterally along the length of the interior of the body 1 from the input port 4 to the output port 5. Sidewalls 16 of the cavity C extend vertically from both of the ledges 14 to a horizontal rim 17 at the top of the body 1, that is coplanar with the uppermost perimeter faces 10 of the ports 4 and 5.

The inlet and outlet ports 4 and 5 are defined by circular surfaces 15 extending axially from the cavity C. A detent is formed in the cavity C above surfaces 15. The detent if formed by a curved surface 18 that runs laterally from an approximate 45 degree arc, centrally located along the top of the outermost perimeter of the circular surface 15, toward the fitting plate 6a for approximately half the length of the input port 4. Another sidewall 19 rises vertically, from the edge of the surface 18 opposite the ledge 15, to the rim 17. Two parallel sidewalls 20 rise vertically from the lowermost edges of the surface 18 to the rim 17, each being perpendicular to, and intersecting, the sidewall 19 along their outermost edges.

Two end faces 21, coplanar with one another and parallel to the end face 9 of the fitting plate 6a, join the faces 20, the ledge 15, the sidewalls 16 and the rim 17 in the cavity C, on either side of the input port 4. Each face 21, on its respective side of the port 4, extends from the innermost edge of the face 19, to an arc of the circular ledge 15 that runs between the intersections of the ledge 15 with the face 20 and the sidewall 16, to the edge of the sidewall 16 that runs vertically from the point on ledge 14 nearest the port 4 to the rim 17, and to rim 17.

Figure 3:
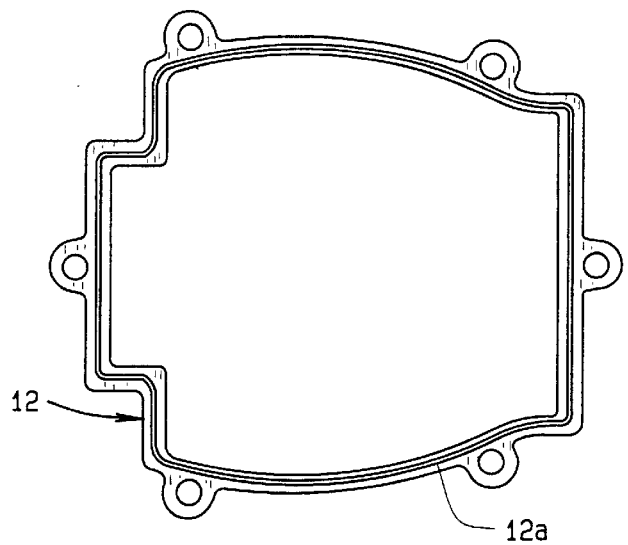
FIG. 3 is a bottom view of a lid gasket.

A gasket groove 22 extends along the rim 17 at the edge of the cavity C in the body 1. The gasket groove 22 is sized and shaped to accommodate a ridge 12a (FIG. 3) on one side of the gasket 12 (FIG. 3). The cross-sectional dimensions of the groove 22 and the gasket ridge 12a are such that the gasket ridge 12a fits snugly into the groove 22 when the gasket 12 is placed atop the body 1 of the valve A.

Figure 5:
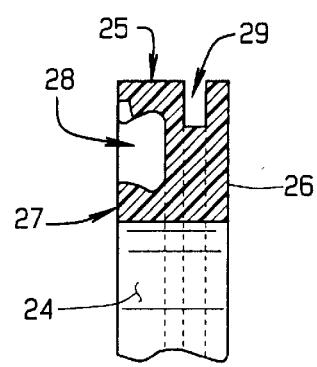
FIG. 5 is a cross-sectional view of the seal mount.
Figure 4:
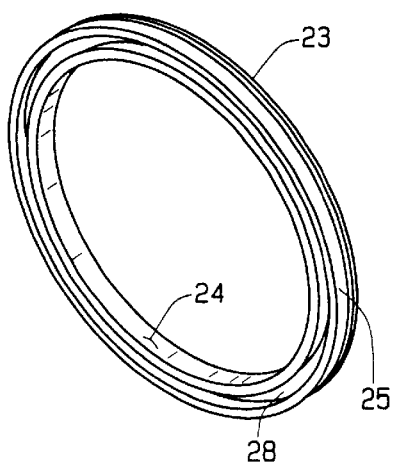
FIG. 4 is a perspective view of the seal mount.

A seal mount 23 (FIGS. 4 and 5) is positioned in the ports 4 and 5 to mount a seal in the ports 4 and 5. The seal is circular in plan and having generally square in cross-section (FIG. 5). The seal mount 23 comprises a cylindrical inner surface 24 with a diameter equal to the diameter of the input port 4, a cylindrical outer surface 25 with a diameter equal to the outer diameter of the port surface 15, and a back face 26 and a front face 27, such that the surfaces 24 and 25 are concentric. A circular groove 28, shaped and sized to hold a seal ring (such as a Quad-Ring® seal available from Minnesota Rubber of Minneapolis, Minn.), runs the full circumference of the front face 27. Another groove 29, having a generally square cross-section, runs the full circumference of the outer cylindrical surface 25. The seal mount 23 is secured in the ports 4 and 5 with the back face 26 against the port surface 15. The seal is then received in the seal mount groove 28.

Figure 7:
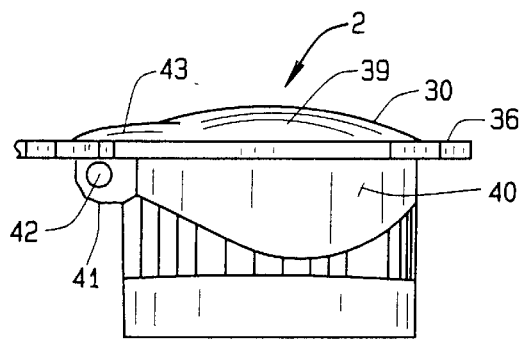
FIG. 7 is a side elevational view of a lid assembly of the check valve.
Figure 8:
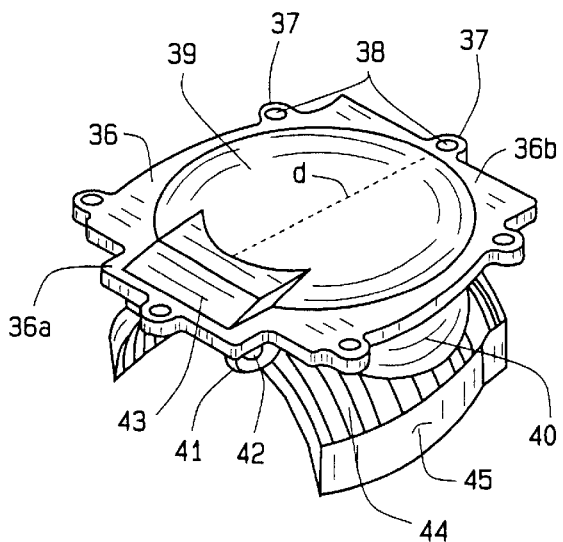
FIG. 8 is a perspective view of the lid assembly.
Figure 10:
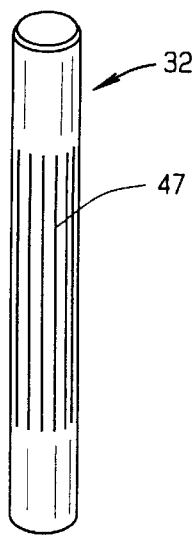
FIG. 10 is a perspective view of a pin used to in lid assembly.
Figure 9:
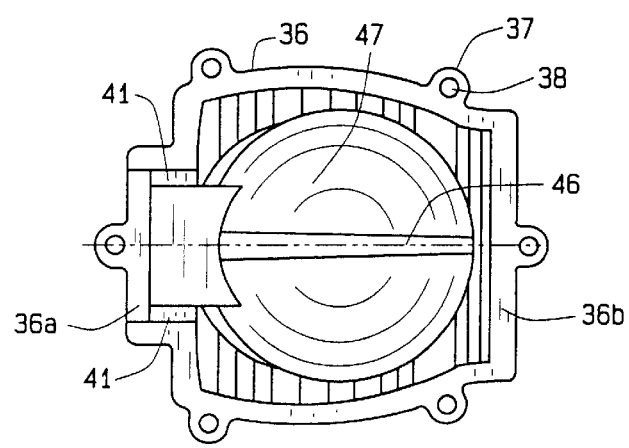
FIG. 9 is a bottom plan view of the lid assembly.
Figure 11:
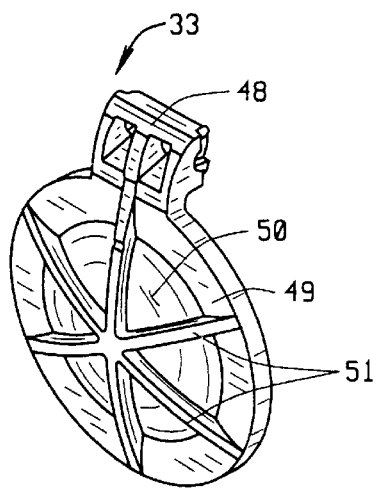
FIG. 11 is a perspective view of a poppet of the check valve.
Figure 12:
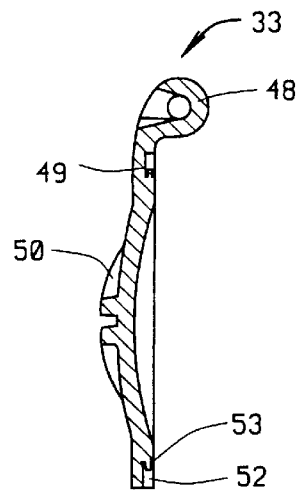
FIG. 12 is a cross-sectional view of the poppet.

The lid assembly 2 (shown in detail in FIGS. 7–12) comprises a lid 30, two bushings 31, two pins 32, a poppet 33, and a spring 35. A seal plate 36 at the top of the lid 2 (FIGS. 7 and 8), having a thickness approximately equal to that of the sidewalls 16 of the body 1, generally conforms in shape to the top of the body 1 without the end plates 6a and 6b, having an input end 36a and an exit end 36b. Six ears 37 surround the seal plate 36, each having a central bore 38 with a diameter slightly larger than that of the bolts 3 to allow the bolts to turn freely in the bores 38 with little or no lateral or angular movement.

Rising from the center of the seal plate 36 is a dome 39, having a height approximately three times that of the seal plate 36, and a radius slightly larger than the cross-sectional radius of the centermost section of the elliptical portion of the cavity C. The dome 39 is positioned on the seal plate 36 such that it contains a diameter d, running perpendicular to the input and exit ends 36a and 36b, that bisects the seal plate 36. Descending perpendicularly from the seal plate 36 is a hollow cylindrical neck 40, being concentric with, and having an outer diameter approximately equal to that of, the dome 39. Also descending perpendicularly from the seal plate are two ears 41, both parallel to and approximately one half the radius of the dome 39 from the diameter d. The ears 41 are each connected in part to the side of the neck 40, have a height less than that of the sidewalls 20 of the cavity C, and a thickness equivalent to that of the seal plate 36. The dimensions and locations of the ears 41 are such that the ears 41 can readily fit between the sidewalls 20 of the detent above the inlet 4.

Through each of the ears 41 runs a bore 42, having a central axis parallel to the seal plate 36 and perpendicular to the diameter d, each bore 42 being axially aligned with one another and having a diameter generally equal to the outer diameter of the bushings 31. Above the ears 41, a structural member 43 rises from the seal plate 36, and extends along an ascending plane to a plane above and parallel with the seal plate 36 to intersect with the dome 39 at approximately half the height of the dome 39, therein providing additional structural support for the ears 41.

Descending from the neck 40 of the lid 2 is a generally dome shaped body 44, having outer walls 45 shaped to conform to, and fit snugly within, the sidewalls 16 of the cavity C, and further shaped such that their lowest edges abut against, for the full length of, the ledge 14 of cavity C. Beneath the dome 39 and inside the neck 40 and body 44 (FIG. 9), the lid 2 houses an interior dome 47 that opens to expose a portion of the underside of the seal plate 36 and the inner faces of the ears 41. For added strength, a rib 46 spans the center of the inner dome 45 from between the ears 41 to the inner surface of the neck 40 opposite the ears 41.

Figure 6:
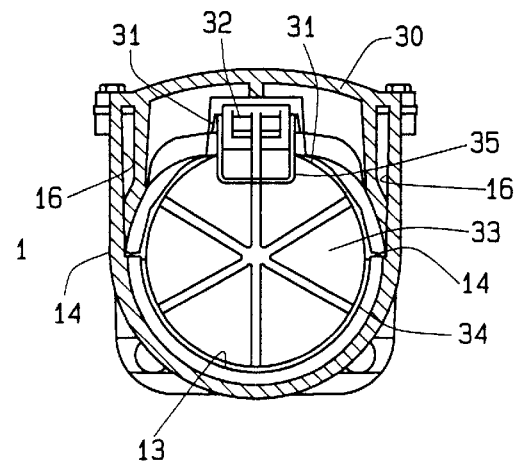
FIG. 6 is a cross-sectional view of the fully assembled check valve with the gate closed, as viewed from the center of the valve toward the input side of the valve.

Each of the bushings 31 is coaxially mounted in one of the ears 41 (FIG. 6), such that the outermost faces of the opposing bushings 31 are flush with the outermost faces of the ears 41. The pin 32 extends through the bushings 31, such that the ends of the pin 32 are generally flush with the outermost faces of the ears 41 and the pin 32 may rotate freely within the bushings 31. Numerous straight knurls 47 (FIG. 10) score the full circumference of the pin 32, each parallel to the central axis of the pin 32 and running the length between the innermost faces of the bushings 31, the knurls being distanced slightly from the bushings 31 so as not to hinder the free rotation of the pin 32 within the bushings 31.

A sleeve member 48 of the poppet 33 (FIG. 11) attaches the poppet 33 to the pin 32, the poppet 33 being held fixedly to the pin 32 by the knurls 47, such that the poppet 33 and the pin 32 rotate in unison about the pin's central axis within the bushings 31. From the sleeve 48, the poppet transitions into a flat outer ring 49 that surrounds a dome 50. Rising above and spanning across the convex side of the dome 50 are six structural ribs 51, each radiating from the center of the dome 50 to the outer edge of the outer ring 49. On the opposite side of the poppet 33 from the ribs 51 (FIG. 12), a channel 52, having a rectangular cross-section with a horizontal tongue 53 midway up the innermost side of the rectangle, is formed about the full circumference of the front face of the outer ring 49.

Figure 13A:
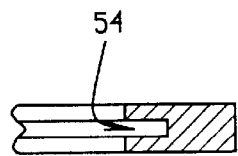
FIG. 13A is a cross-sectional view of the seal ring.
Figure 13:
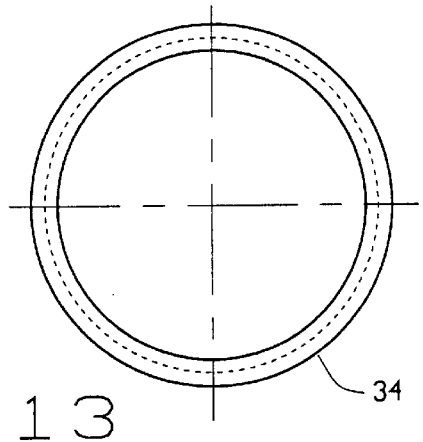
FIG. 13 comprises a top plan view of a seal-ring used in conjunction with the poppet.

The channel 52 has a depth, and inner and outer diameters equal to the same dimensions of the ring-shaped brass insert 34 (FIG. 13). The insert 34 has a small channel 54, located on the inner edge of the insert 34 (FIG. 13a), having dimensions equal to the dimensions of the tongue 53 on the poppet 33, such that the tongue 53 is received in the channel 54. When the insert 34 is pressed into the channel 52 of the poppet 33 with sufficient force, the tongue 53 seats snugly into the channel 54 in the insert 34 to secure the insert 34 in place on the poppet 33.

Figure 14:
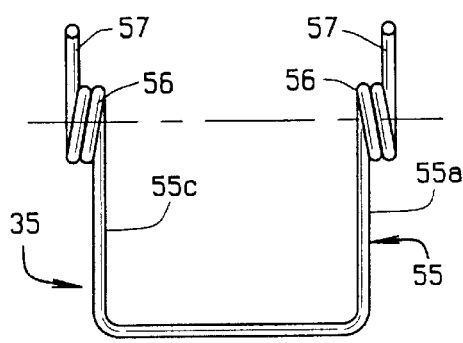
FIG. 14 is a top plan view of a spring for the poppet.
Figure 14A:
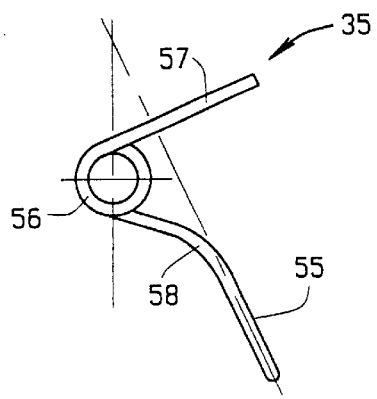
FIG. 14A is a side elevational view of the spring.
Figure 20:
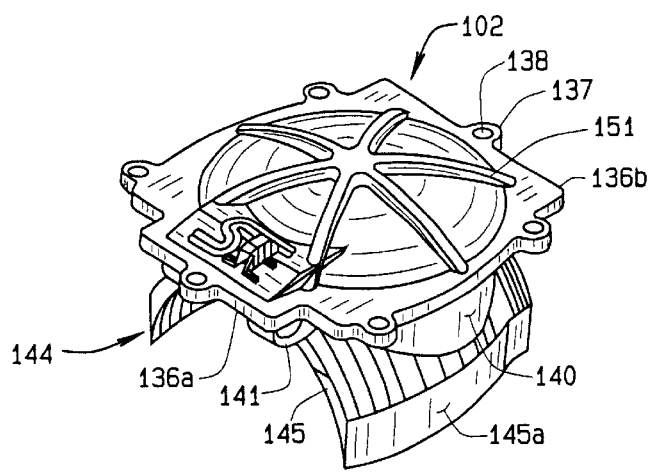
FIG. 20 is a perspective view of the lid assembly of the check valve of FIG. 15.
Figure 21:
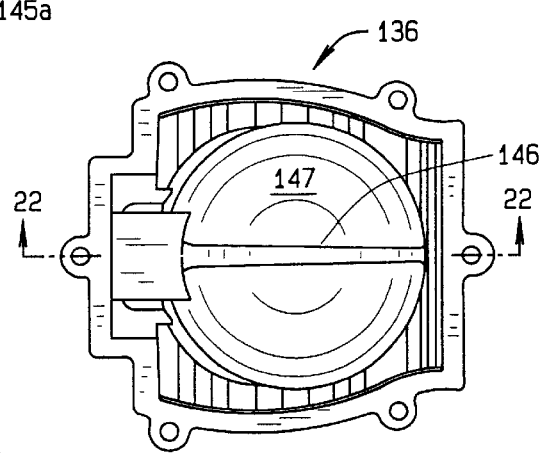
FIG. 21 is a bottom plan view of the lid.
Figure 23:
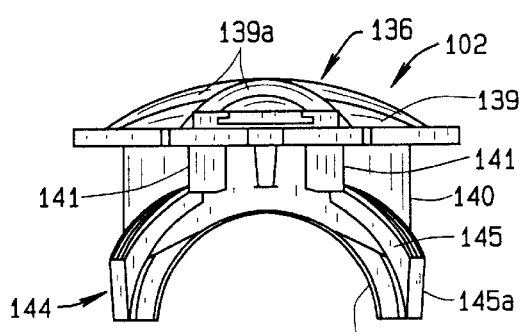
FIG. 23 is an end elevational view of the lid assembly.
Figure 22:
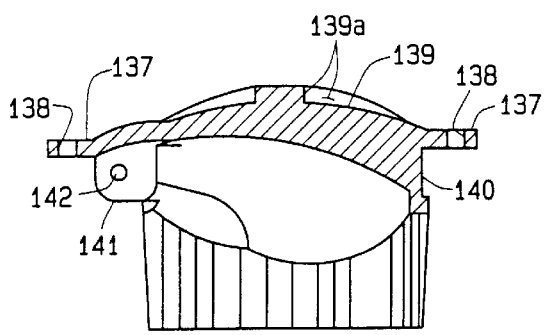
FIG. 22 is a cross-sectional view of the lid assembly taken along line A—A of FIG. 21.

The spring 35 (FIG. 14), comprised of a single, contiguous, stainless steel spring wire, is generally U-shaped, having a generally U-shaped base 55 having legs 55a and residing in a plane p, a coil 56 located at the end of each leg 55a, and pair of parallel tails 57 extending from the double coils 56 to the top of the spring 35. The coils 56 share a common central axis, and have an inner diameter slightly greater than the outer diameter of the pin 32. The base legs 55a each have a bend 58, of approximately 45 degrees, located between the base of spring 35 and each double coil 56. The bend 58 raises the double coils 56 above the plane p containing the base 56. The tails 57 extend from the double coils 56 perpendicularly back toward, and through the plane p. The spring 35 is thus configured to enable the coils 56 to fit around, and rotate freely about, the pin 32, while the base 55 presses against the rib 51 of the poppet 33, nearest the sleeve 48, and the tails 57 press against that portion of the underside of the seal plate 36 between the ears 42.

The body 1, lid assembly 2, and poppet 33 of the check valve A are all constructed of a light weight plastic material, such as a polyamide available from EMS-Chemie under the name Grilon PVZ-5H with 50% G.F. Nylon and an impact modifier. This material, and others like it, provide adequate strength for the check valve, along with the advantages of having a lighter weight than metals, including aluminum, and smoother member surfaces.

In use then, when seal mount 23 is properly seated on the port surface 15 in the cavity C of the valve A, a seal of appropriate dimensions is properly seated in the groove 28 of the seal mount 23, and the lid assembly 2 is properly and fully placed within the body 1 of the valve A, the front face of insert 35 on the poppet 33 will align concentric to and flush with the seal in the seal mount 23. This is the "closed" position for valve A. The spring 35 imparts a force against the ribbed side of the poppet 33 that maintains the poppet in the "closed" position.

When a sufficiently strong counter force is applied to the concave side of the dome 50 of the poppet 33, such as when bulk material is being directed through the inlet port 4 of the valve A, the poppet swings up against the inner dome 45 of the lid 30. The shape of the concave side of the poppet 33 in conjunction with the exposed walls of the inner dome 45 of the lid 30 and the elongated hemispherical surface 13 in the body 1, combine to form a generally spherical cavity through which the bulk material passes inside the valve A. This shape creates much less turbulence than the shapes of conventional swing valves and thereby offers greater transfer efficiency and throughput velocities. Should the flow of material begin to reverse for any reason, the poppet 33 will quickly return to, and remain in, the "closed" position to prevent the possibility of any such backflow.

Finally, because the lid 30, the bronze bushings 31, the pin 32, the poppet 33, and the brass insert 34 all comprise a single unitized lid assembly 2, the entire core of the check valve A can be quickly and readily examined by simply removing the lid assembly 2 from the body 1. This exposes the Quad-ring seal in the seal mount for ready examination and replacement, as well as facilitating rapid examination and maintenance of the lid assembly 2 itself.

A second embodiment of the check valve A' is shown in FIGS. 15–25. The check valve A' is substantially similar to the check valve A of FIG. 1. It includes a body 101 identical to the body 1 of valve A. A lid assembly 102 closes the body 101. The lid assembly 102 is slightly different from the lid assembly 2. The lid assembly 102 includes a seal plate 136 having a perimeter sized and shaped to close the open top of the body 101. A series of ears 137 surround the seal plate 36. The ears have holes 138 through which bolts pass to secure the lid assembly 102 to the body 101.

A gasket 112 is positioned on the upper edge of the body walls, and the seal plate 136 is placed on top of the gasket. The gasket 112 thus forms a fluid tight seal between the body 101 and the seal plate 136. The gasket 112 is corresponds in shape to the circumferential shape of the body walls. The gasket 112 includes a rib 112a which fits in a groove in the upper edge of the body wall and a plurality of ears 112b which correspond in size, shape, and position to the ears of the seal plate 136. Hence, the bolts pas through the gasket ears when the cover assembly 102 is secured to the body 101. The gasket 112 also includes legs 112c which are positioned effectively at the four corners of the gasket 112. The gasket legs 112c help locate the gasket 112 on the body 101.

A dome 139 rises up from the center of the seal plate 136. The dome 139 has a radius slightly larger than the cross-sectional radius of the centermost section of the elliptical portion of the cavity C. The dome 139 is positioned on the seal plate 136 such that it contains a diameter d, running perpendicular to the input and exit ends 136a and 136b, that bisects the seal plate 136. A plurality of intersecting ribs 139a extend over the outer surface of the dome 139.

A cylindrical neck 140 descends from the seal plate 136. The neck 140 is concentric with, and has an outer diameter approximately equal to that of, the dome 139.

A pair of opposed ears 141 also descend from the seal plate 136. As best seen if FIGS. 19 and 25, the ears 141 have a circumferential wall 141a defining a pocket 141b with a floor 141c. A central opening 142 is formed in the pocket floors 141c. The openings 142 of the opposed ears 141 are aligned with each other.

A truncated dome shaped body 144 descends from the neck 140. The dome shaped body 144 has arced side walls 145 ending with a flat, vertical face 145a shaped to conform to, and fit snugly within, the sidewalls 16 of the cavity C, and further shaped such that their lowest edges abut against, for the full length of, the ledge 14 of cavity C. The dome shaped body 144 has an inner surface 147 which defines a radius corresponding to the radius defined by the lower portion of the cavity in the body 101. For added strength, a rib 146 spans the center of the inner dome 147 from between the ears 141 to the inner surface of the neck 140 opposite the ears 141. The dome shaped body, in conjunction with the lower section of the valve body cavity C defines a substantially spherical chamber when the cover assembly 102 is mounted on the body 101, with entrance and exit ports through which fluid material flows.

As seen in FIG. 25, a pin 132 extends through each of the ear holes 142. In FIG. 25, two pins are used, which of which extends into the space between the ears 141. However, a single pin, which spans the distance between the ears 142 (such as used in the valve A) can also be used. The pin 132 includes a slot 132a extending across the potion of the pins 132 in the ear pockets 141b.

The poppet 133 is pivotally mounted to the lid assembly 102 by means of the pins 132. The poppet has a main, generally circular body 133a with a sleeve member or arm 148. The arm 148 has a hole 148a into which the pins 132 extend. The pins 132 are sized to be frictionally received in the sleeve hole 148a. Hence, the pins 132 act as axles for the poppet 133, and rotate in the ear holes 142 as the poppet 133 is pivot relative to the dome shaped body 144.

The poppet body 133a includes a flat outer ring 149 from which the sleeve member 148 extends. The ring 149 surrounds a dome 150. Rising above and spanning across the convex side of the dome 150 are structural ribs 151, each radiating from the center of the dome 150 to the outer ring 149. On the opposite side of the poppet 33 from the ribs 51 (FIG. 12), a channel 52, having a rectangular cross-section with a horizontal tongue 53 midway up the innermost side of the rectangle, is formed about the full circumference of the front face of the outer ring 49.

A torsion spring 135 is received in the pockets 141b of the ears 141. The torsion spring is journaled about the each pin 132 and includes a coil 135a having ends 135b and c. The end 135b of the spring 135 is bent to be received in the pin slot 132a, and the end 135c extends outwardly from the coil to engage the under side of the lid assembly 102, as seen in FIG. 26.

Figure 27:
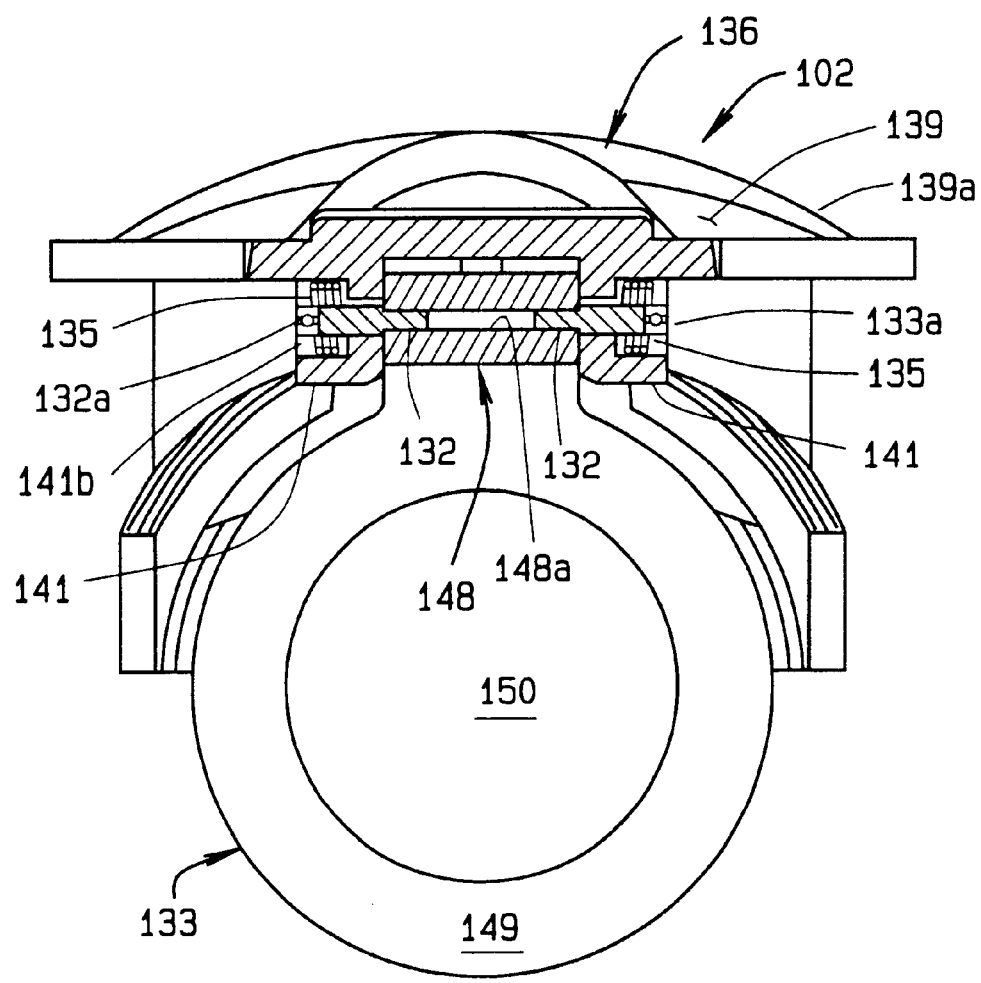
FIG. 27 is a cross-sectional view of the lid assembly taken along line B—B of FIG. 26 showing the hinged connection of the poppet to the lid.

The poppet 133 is shown in its down position in FIG. 26, in which position, the poppet would close the inlet port into the valve body 101. As can be appreciated, when the poppet 133 is rotated counterclockwise (with respect to FIG. 26) into the cavity, the end 135b of the torsion spring 135 will engage the underside of the lid 136. The interaction of the spring, as such a point, between the pins 132 (which are engaged by the spring) and the lid 136, will create a spring force which will urge the poppet 133 back to the position shown in FIGS. 26 and 27.

As can be appreciated, in both embodiments of the check valve, the lid assembly and the body define complementary cavities, such that, when the lid assembly is mounted to the body, they form a spherical chamber through which the flowable material passes. Further, the walls of the body and the lid assembly are formed such that there is a smooth transition on the chamber wall between the body and the lid assembly. Hence, the flowable material is presented with a substantially smooth surface to reduce the potential of turbulence within the valve, and increase throughput through the valve. Lastly, the lid assembly, to which the poppet is hingedly mounted) in both embodiments, is removably mounted to the body. Thus, by removing the bolts or screws which secure the lid assembly to the body, the lid assembly and poppet can be removed. This makes for easy inspection (and replacement if necessary) of the poppet and its associated seals.

As various changes could be made in the above constructions without departing from the scope of the invention, it is intended that all matter contained in the above description or shown in the accompanying drawings shall be interpreted as illustrative and not in a limiting sense. For example, although the valve lid assembly 2 and body 1 are preferably made from plastic, they can be made from other materials as well. Additionally, the inner surface or wall of the lid assembly and body can be coated with a material which will resist pitting, if a different material is required for the exterior surfaces of the check valve. This will produce a valve in which the walls of the chamber are lined with a material which will substantially resist pitting.

What is claimed is:

1. A check valve assembly including a valve body defining a chamber, an inlet port, an outlet port, and a poppet positioned in the cavity to be movable between a first position in which the poppet closes one of the ports to prevent the flow of flowable material through the valve assembly and a second position in which the poppet allows for the flow of flowable material through the valve assembly; the valve body including:

a bottom portion having an open top; the bottom portion defining a cavity defining a portion of a sphere; and a lid assembly which closes the open top of the bottom portion; the lid assembly defining a cavity defining a portion of a sphere; the bottom and top portion cavities being formed by walls which, when the lid assembly is assembled to the bottom portion, defines a sphere, such that the valve chamber is substantially spherical in shape.

2. The check valve assembly of claim 1 wherein said lid assembly is removably connected to said bottom portion and said poppet is hingedly mounted to said lid assembly.

3. The check valve assembly of claim 1 wherein the poppet is biased to said first, closed position by a spring.

4. A check valve assembly including a housing defining a chamber and including an inlet port, an outlet port, and a poppet positioned in the chamber to be movable between a first position in which the poppet closes one of the ports to prevent the flow of flowable material through the valve assembly and a second position in which the poppet allows for the flow of flowable material through the valve assembly;

said housing comprising a base portion defining an opened cavity and a lid assembly removably mounted to said base portion which closes said opened cavity; said poppet being hingedly mounted to said lid assembly; whereby, when said lid is removed from said check valve assembly, said poppet is also removed from said check valve assembly;

said lid assembly also defines an open cavity, said cavities of both said base portion and said lid assembly defining a portion of a sphere, such that, when said lid assembly is placed on said body portion, said cavities, in combination, define said chamber, and said chamber is substantially spherical.

5. The check valve assembly of claim 4 wherein the poppet includes a circumferential groove and a seal being received in said groove.

6. The check valve assembly of claim 4 wherein the walls of the check valve chamber are made of a material which will substantially resist pitting.

* * * * *